US009058766B2

(12) United States Patent
Zhang et al.

(10) Patent No.: US 9,058,766 B2
(45) Date of Patent: Jun. 16, 2015

(54) DEVICE AND METHOD FOR DETECTING A SHORT-CIRCUIT DURING A START-UP ROUTINE

(71) Applicant: STMICROELECTRONICS (SHENZHEN) R&D CO. LTD, Nanshan, Shenzhen (CN)

(72) Inventors: HaiBo Zhang, Shenzhen (CN); Jin Li, Shenzhen (CN)

(73) Assignee: STMICROELECTRONICS (SHENZHEN) R&D CO. LTD, Shenzhen (CN)

( * ) Notice: Subject to any disclaimer, the term of this patent is extended or adjusted under 35 U.S.C. 154(b) by 149 days.

(21) Appl. No.: 13/649,821

(22) Filed: Oct. 11, 2012

(65) Prior Publication Data

US 2013/0093326 A1 Apr. 18, 2013

(30) Foreign Application Priority Data

Oct. 14, 2011 (CN) .......................... 2011 1 0317078

(51) Int. Cl.
*H02H 3/20* (2006.01)
*H05B 37/02* (2006.01)
*G09G 3/20* (2006.01)

(52) U.S. Cl.
CPC .............. *G09G 3/20* (2013.01); *G09G 2330/02* (2013.01); *G09G 2330/08* (2013.01); *G09G 2330/10* (2013.01)

(58) Field of Classification Search
None
See application file for complete search history.

(56) References Cited

U.S. PATENT DOCUMENTS

| | | | | |
|---|---|---|---|---|
| 6,201,319 | B1 * | 3/2001 | Simonelli et al. | 307/26 |
| 6,424,513 | B1 * | 7/2002 | Wissell et al. | 361/93.1 |
| 7,800,870 | B2 * | 9/2010 | Matsumoto et al. | 361/18 |
| 7,848,073 | B2 * | 12/2010 | Takahashi | 361/93.2 |
| 8,125,424 | B2 * | 2/2012 | Hong et al. | 345/87 |
| 8,558,470 | B2 * | 10/2013 | Shteynberg et al. | 315/224 |
| 8,884,867 | B2 * | 11/2014 | Hussain et al. | 345/102 |
| 8,907,641 | B2 * | 12/2014 | Zhang et al. | 323/271 |
| 2005/0168491 | A1 * | 8/2005 | Takahara et al. | 345/690 |
| 2011/0273422 | A1 * | 11/2011 | Park | 345/211 |
| 2013/0093326 | A1 * | 4/2013 | Zhang et al. | 315/121 |

FOREIGN PATENT DOCUMENTS

CN 202307088 U 7/2012

* cited by examiner

*Primary Examiner* — Jason M Crawford
*Assistant Examiner* — Nelson Correa
(74) *Attorney, Agent, or Firm* — Allen, Dyer, Doppelt, Milbrath & Gilchrist, P.A.

(57) ABSTRACT

A device and method for detecting a short circuit in an electrical component during a start-up routine. In an embodiment, a device may have a problematic display having a short circuit that may result in damage to other components of the device if the device were allowed to fully startup during a normal start-up routine. Thus, power supplied to the panel may be initiated in stages so as to monitor any current that may be flowing through the panel, which in turn, may be indicative of a short circuit in the panel. If enough "leakage" current is detected through the panel during this staged startup routine, then a short-circuit detection circuit may interrupt the startup routine and lock out the operation of the device until the detected short circuit in the panel can be addressed.

15 Claims, 2 Drawing Sheets

DEVICE AND METHOD FOR DETECTING A SHORT-CIRCUIT DURING A START-UP ROUTINE

PRIORITY CLAIM

The present application claims the benefit of Chinese Patent Application Serial No. 2201110317078.2, filed Oct. 14, 2011, which application is incorporated herein by reference in its entirety.

BACKGROUND

Many devices, including laptop computers, smart phones, and other portable computing devices, utilize a display screen for user interaction and user feedback. For example, smart phones commonly have displays comprising liquid-crystal display (LCD) screens that allow a processor to display information and media on the screen. Similarly, other portables devices, such as personal data assistants and laptop computer take advantage of the compact nature of using an LCD as the main visual interface. LCDs have become popular and widespread in usage in many applications because of their relatively robust nature and increasingly cheaper manufacture.

Through usage though, LCD screens, which comprise a matrix of pixels, may become damaged from use and/or abuse. That is, as one or more pixels are compromised, the overall LCD fails to operate properly as rows, columns or clusters of pixels no longer function correctly after damage. As a result, circuitry that drives the operation of the LCD can no longer function properly as well because damaged pixels do not behave as expected. Further, as the overall LCD is compromised in at least some of its pixels, the damaged LCD then may become a short circuit since the damaged pixels do not exhibit the same electrical characteristics as fully functioning pixels. If enough pixels, or a specific combination of pixels becomes damaged resulting in a short circuit, additional components in the overall device may also be damaged as electrical current may flow where no current was intended. Thus, damaged pixels in LCD devices may lead to further damage to other components in the device beyond the damaged LCD.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be a device and method for detecting a short circuit in an electrical component during a start-up routine. In devices that have display panels, problems that sometimes arise in the display panel may result in a detrimental short circuit that may cause damage to other components of the device if the device were allowed to fully startup during a normal start-up routine. In an embodiment discussed below, power supplied to the panel may be initiated in stages so as to monitor any current that may be flowing through the panel, which in turn, may be indicative of a short circuit in the panel. If enough "leakage" current is detected through the panel during this staged startup routine, then a short-circuit detection circuit may interrupt the startup routine and lock out the operation of the device until the detected short circuit in the panel can be addressed. Different threshold of leakage current may be configured for different devices and the time frames for detecting any leakage current may also be adjusted. These and other aspects of various embodiments are discussed in further detail below.

Figure 1:
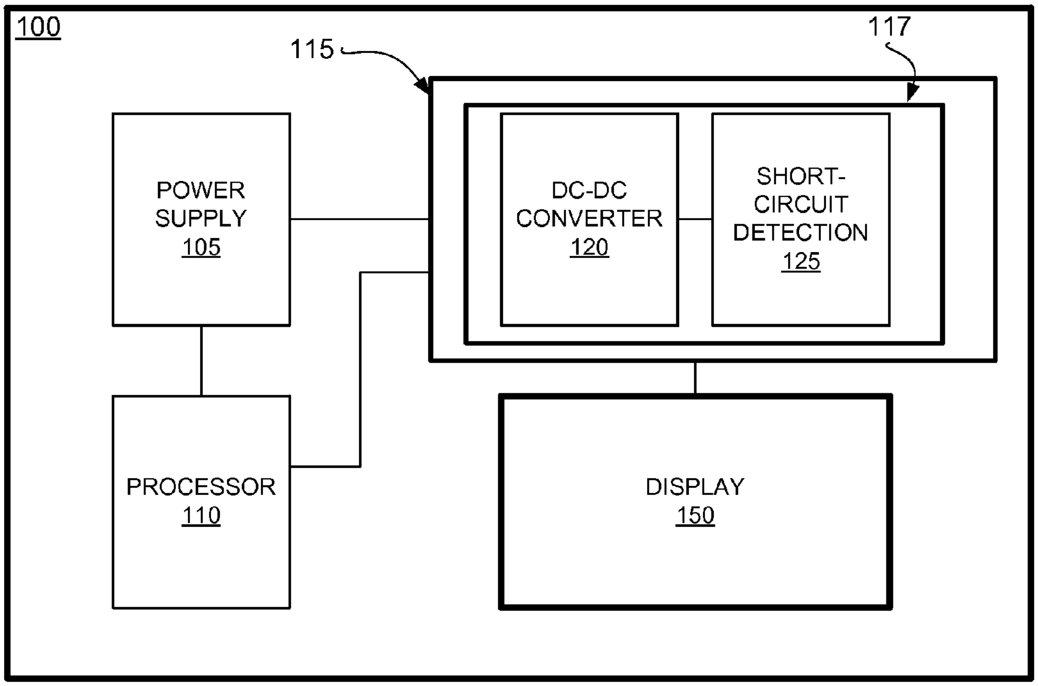
FIG. 1 shows a diagram of a device having an LCD with a short-circuit detection circuit according to an embodiment.

FIG. 1 shows a diagram of a device 100 having a display 150 with a power supply circuit 117 having a short-circuit detection circuit 125 according to an embodiment. The display 150 may comprise an array of pixels that may be operated under control of a display driver circuit 115. In this embodiment, the display driver circuit 115 (or simply display driver) includes a power supply circuit 117 which may or may not be part of the same integrated circuit. In other embodiments, the display driver 115 is separate from the power supply circuit 117 and disposed on separate integrated circuit dies. Further, the power supply circuit may include a conventional dual DC-DC converter 120 operable to supply voltages to the display 150.

In digital imaging, a pixel, (a term derived from the words picture element) is a single point in a digital image which is often the smallest addressable screen element in a display 150. When a display driver 115 is used to generate an image on the display 150, the address of each pixel may correspond to its coordinates in an X-Y grid pattern but may comprise other diagonal patterns as well. Each pixel, which may be a small Light Emitting Diode (LED), may display a sample of an original image, wherein each pixel may be illuminated at differing levels to provide the most accurate representation of the original as possible. The intensity of each pixel is variable and in color image displays, a color is typically represented by three or four component intensities such as red, green, and blue, or cyan, magenta, yellow, and black for each pixel. Together, these pixels may form an entire display 150 that is often referred to as an Active Matrix Organic Light Emitting Diode (AMOLED) panel.

The display resolution of a display 150 (such as a screen of a computer monitor) is the number of distinct pixels in each dimension that can be displayed. Thus, a common LCD screen (e.g., a display 150) for a computer display panel may be 2048 (width)×1536 (height). For handheld devices, resolution may be smaller since the overall display area is also smaller. For example, a typical resolution for a handheld device may be 960 (height)×640 (width).

The device 100 may include a processor 110 configured to control each electronic component within the device. Thus, the processor 110 may operatively control the display driver. As may often be the case, various components within the device may be realized on a single integrated circuit 115 that may include one or more functional circuit blocks such as the power supply circuit 120 as well as the short-circuit detection circuit 125. Although shown in FIG. 1 as a single integrated circuit chip (e.g., the display driver 115), these components may be realized on two or more integrated circuit chips. The device 100 may further include a power supply 105 such as a battery or an AC plug-in source. The power supply 105 provides various voltage signals for the components of the device 100 including the display driver 115 and the processor 110.

The device 100 may be personal data assistant, mobile computing device, smart phone, laptop computer, monitor for a desktop computer, or any other device that utilizes a display 150 having pixels that may be compromised resulting in a short circuit that may, in turn, damage other components within the integrated circuit or the entire device 100. As is discussed further below with respect to FIG. 2, the short-circuit detection circuit 125 may detect a short circuit prior to any damage to any component resulting.

Figure 2:
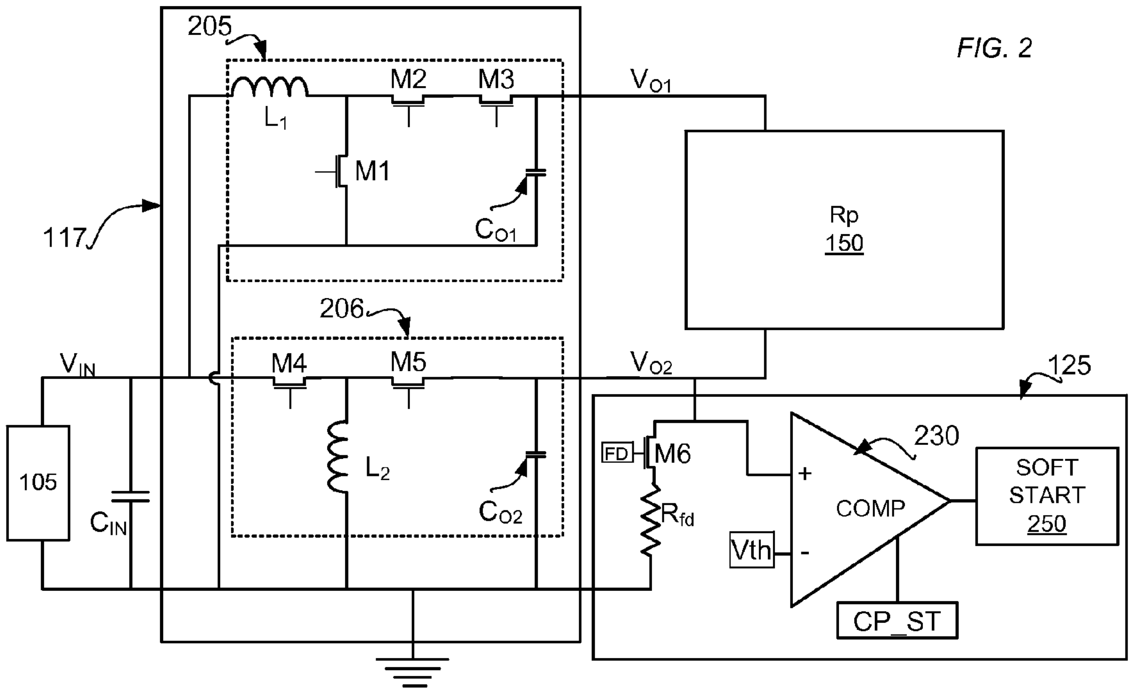
FIG. 2 shows a circuit diagram of a power supply circuit having a short-circuit detection circuit according to an embodiment.

FIG. 2 shows a circuit diagram of a power supply circuit 117 and a short-circuit detection circuit 125 according to an embodiment. In this circuit diagram, a power supply 105 may provide an input power voltage Vin that may be used to supply voltage to various components of the device 100 including the power supply circuit 117. The input voltage Vin also may be associated with an input capacitor Cin for filtering voltage spikes and other transient signals on the power supply voltage.

The dual DC-DC voltage converter 117 as shown in FIG. 2 may utilize the input voltage Vin (which may be supplied at in this embodiment between a range of 2.3 V to 4.5 V) and internally manipulate the voltage through a series of transistor switches and inductors to produce two equal and opposite voltages for use with additional components to which the power supply circuit 117 is coupled. In one embodiment, the dual DC-DC voltage converter 117 produces a first high-side voltage $V_{O1}$ of approximately 4.6 V and a second low-side voltage $V_{O2}$ of approximately −4.9 V (though this may also range between −2.0 V and −7.0 V). This may be accomplished through known techniques for generating a converted high-side voltage using a boost converter 205 and components M1, M2, M3 and L1. Through known switching techniques, M1, M2, and M3 may be switched by a coupled processor (such as processor 110 of FIG. 1) to produce a boosted voltage $V_{O1}$ higher than the input voltage Vin. Similarly, through known switching techniques, an inverting boost converter 206 may also utilize a controlled switching technique from a processor to control switches M4 and M5 to produce an inverted voltage $V_{O2}$. Thus, in a steady-state of operation, $V_{O1}$ will be approximately 4.6 volts and $V_{O2}$ will be approximately −4.9 volts. These voltages are used to supply the panel 150 represented in FIG. 2 as simply a resistance Rp. Since DC-DC switching techniques are known, the internal operation of the boost converter 205 and the inverting converter 206 are not discussed in greater detail herein.

The panel 150 is modeled in this circuit as simply a resistance Rp. This resistance Rp is very high (at least during initial startup operating conditions as the individual pixels in the array are not yet being switched) when compared to other components in the overall device and is, therefore, easily modeled as infinite. However, if the panel 150 becomes damaged or otherwise compromised, this resistance becomes much smaller and somewhat commensurate with other resistances of other electrical components. This is because damaged pixels generally behave as a short circuit across the damaged pixel. If the panel 150 is damaged in a specific manner (e.g., some or all pixels in one row or column, for example), then the equivalent resistance Rp of the overall panel may even fall to near zero and a short circuit develops between $V_{O1}$ and $V_{O2}$. Thus, if a short circuit develops in the display 150, the voltage node $V_{O2}$ may start to rise toward the voltage $V_{O1}$. If this voltage $V_{O2}$ is raised beyond a threshold, other components (such as the dual DC-DC converter 117 itself) may be damaged because of the failed panel 150 acting like a short circuit or very small resistor.

A short-circuit detection circuit 125 may monitor this voltage node $V_{O2}$ during a converter 117 start-up routine to assure that if the voltage $V_{O2}$ rises above a threshold, the converter start-up routine is interrupted so that no damage to other coupled components is allowed to happen. As is described further below, a staggered start-up routine allows for detection of short-circuits in the panel 150 by first turning on only a portion (the boost portion 205) of the DC-DC converter 117 and then, after a time, starting up a second portion (the inverting portion 206) of the converter 117. This is accomplished by coupling the voltage node $V_{O2}$ to ground through a fast discharge circuit comprising a transistor M6 and a fast discharge resistor during the startup of the first portion. By sizing the fast-discharge resistor Rfd to a value that is comparable to a damaged or failed panel 150, a "leakage" current may be drawn through the panel 150 and through the fast-discharge resistor Rfd. This leakage current will cause the voltage $V_{O2}$ to rise. By comparing the $V_{O2}$ to a threshold voltage $V_{th}$ at a comparator 230, one can set a soft-start interrupt signal 250 to interrupt the start-up routine of the power supply circuit if enough leakage current causes $V_{O2}$ to rise above the threshold voltage $V_{th}$.

This fast discharge resistor Rfd may be approximately 300 ohms in one embodiment. When a panel 150 becomes compromised, the approximate resistance Rp falls to about 3 k ohms or lower. The short-circuit detection circuit 125 monitors (via the comparator 230) the voltage at the inverted supply node $V_{O2}$. In this sense, it may also be said that the short-circuit detection circuit 125 monitors the current through the panel 150 during startup as well, and such current may be defined as:

$$\frac{V_{o1} - V_{o2}}{R_P} = \frac{V_{o2}}{R_{fd}} + C_{o2} \times \frac{dV_{o2}}{dt}$$

where the current through the panel is the voltage difference between $V_{O1}$ and $V_{O2}$ divided by the resistance Rp of the panel 150. Thus, this equation for current through the panel 150 will be the same as current sunk through the discharge resistor Rfd as mitigated by current siphoned by the output capacitor $C_{O2}$ over time. Solving for the voltage at the inverted supply node with respect to time, one sees the equation:

$$V_{o2}(t) = \frac{R_{fd}}{R_P + R_{fd}} \times V_{o1} \times \left(1 - e^{-\frac{R_P + R_{fd}}{C_{o2} \cdot R_P \cdot R_{fd}} \times t}\right)$$

This voltage response signal $V_{O2}$(t) is shown below with respect to FIG. 3. As one can see, over time, the transient response from the capacitor becomes negligible as the steady-state response settles to:

$$V_{o2}(t \to \infty) = \frac{R_{fd}}{R_P + R_{fd}} \times V_{o1}$$

Thus, when operating normally during a startup phase, the relatively infinite resistance Rp of the panel 150 keeps $V_{O2}$ to a very low voltage (i.e., very little leakage current the relatively infinite resistance of the panel 150) which can be approximated at 0.0 V.

However, from this same equation, one can see that if the panel 150 is compromised (i.e., the electrical resistance of the panel is greatly reduced from one or more damaged pixels), then a short circuit develops across the panel between $V_{O1}$ and $V_{O2}$. In one embodiment then, one may define that a panel 150 is compromised if the resistance of the panel reaches 3 k ohms or lower. Thus, with Rp much closer to $R_{FD}$ the voltage on $V_{O2}$ is no longer 0.0 V:

$$V_{O2}=4.6*300/(3000+300)=418\text{ mV}$$

Here then, when the panel 150 is compromised, the relative resistance Rp of the panel 150 (when compared to the fast-discharge resistor $R_{FD}$) allows $V_{O2}$ to rise beyond an acceptable voltage level. This level may vary with different embodiments. For this embodiment, an acceptable voltage level is 300 mV and below. Thus, the reference voltage Vth coupled to the comparator 230 may be set to 300 mV. When $V_{O2}$ rises above the reference voltage Vth, a soft start interrupt signal 250 is triggered. This signal 250 disables the power supply circuit 117, which may typically be accomplished through a control procedure from a coupled processor 110. To further understand the operation of the power supply circuit 117 in conjunction with the short-circuit detection circuit 125, a timing diagram of a startup sequence is shown and described below with respect to FIG. 3.

Figure 3:
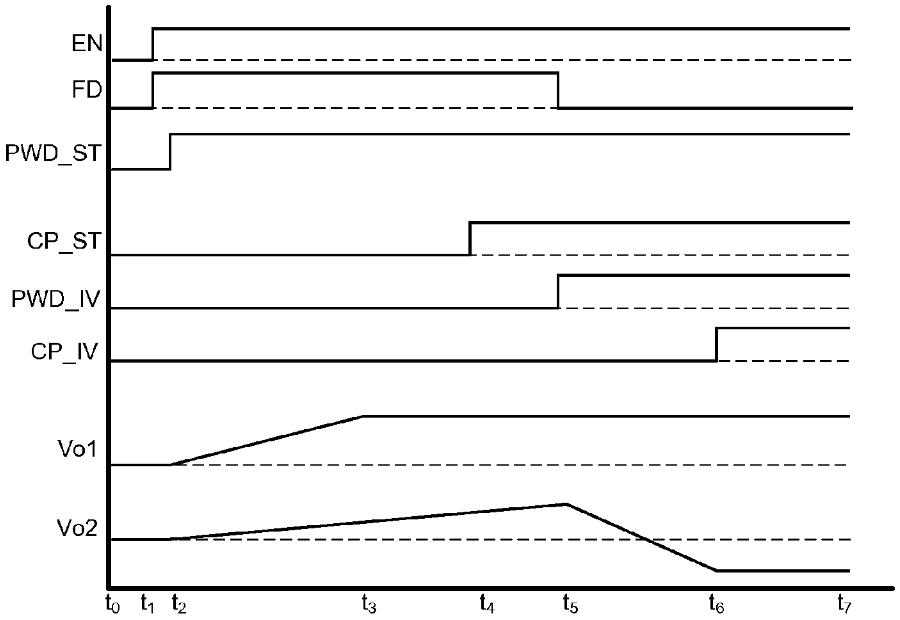
FIG. 3 shows a timing diagram of current signals during operation of the power supply circuit of FIG. 2 according to an embodiment.

FIG. 3 shows a timing diagram of signals during operation of the short-circuit detection circuit of FIG. 2 according to an embodiment. As briefly mentioned above, when the power circuit 117 is first starting, a staggered start-up routine is followed wherein the boost portion 205 of the converter 117 is engaged first and after a delay time, the inverting portion 206 is engaged. This allows for a detection of any short circuit problems in the panel during the first start-up portion.

When first starting then, an enable signal EN transitions from a low-logic level to a high-logic level at time $t_1$. This signal EN begins the startup routine of the power supply circuit 117 and also triggers a short-circuit detection circuit enable signal FD. This signal FD closes the fast-discharge switch M6 such that $V_{O2}$ is coupled to ground through the fast discharge resistor Rfd. Thus, if any voltage develops on $V_{O2}$, then it will flow through M6 and Rfd to ground. As the power supply circuit 117 has yet to begin switching to generate any voltage on any of its outputs ($V_{O1}$ or $V_{O2}$), there is no current flow at the beginning of this routine.

Next, the boost converter portion 205 of the power supply circuit 117 is enabled through a boost start-up signal PWD_ST at time $t_2$. This start-up signal may be representative of a series of control pulses that switch the transistors M1, M2, and M3 of the boost converter on and off according to a pattern suited to produce a voltage of 4.6 volts on $V_{O1}$. Upon beginning the series of control pulses, the voltage on $V_{O1}$ begins to ramp up toward 4.6 volts. The amount of time it takes to ramp up is dependent upon the size of the output capacitor $C_{O1}$. A larger capacitor will result in a longer ramp up time (e.g., time between $t_2$ and $t_3$). As such, depending on the size of this capacitor, one may set the startup time allowed for the boost converter 205 to a desired length of time to ensure that the voltage on $V_{O1}$ reaches 4.6 volts. For example, the time between $t_2$ and $t_4$ may be the startup time allowed for the boost converter. After this time, a boost converter finish signal CP_ST from the processor is set at time $t_4$ indicating the enough time has elapsed such that $V_{O1}$ is now 4.6 volts.

This finish signal CP_ST also enables the comparator 230 of the short circuit detection circuit 125.

As the comparator 230 is now enabled, an immediate comparison to the threshold voltage is accomplished. If there is no short circuit in the panel 150, the $V_{O1}$ should still be at 0.0 volts. Even a small amount of leakage current through the panel 150 will not cause the voltage at $V_{O2}$ to rise much. So long as the panel 150 provides enough resistance to keep $V_{O2}$ below approximately 300 mV, then the startup routine may continue (e.g., not be interrupted by soft start interrupt signal 250). If this comparison results in determining the $V_{O2}$ is below the threshold voltage Vth, then the FD signal transitions from a high-logic level to a low-logic level at time $t_5$ as an indication that the short-circuit detection method has determined that the panel 150 is not compromised. With the FD signal off, the switch M6 is opened and $V_{O2}$ is now ready to ramp down to −4.9 volts through the second phase of the power supply circuit 117 startup routine.

In the second phase of the startup routine, the inverting converter is engaged by an inverting startup signal PWD_IV also at time $t_5$. Much like the boost converter startup signal PWD_ST, the switches M4 and M5 are switched according to a series of pulses configured to produce a voltage of −4.9 volts on the output $V_{O2}$. This second phase of the startup also lasts for a duration of time (from $t_5$ to $t_6$) long enough to allow $V_{O2}$ to ramp down to −4.9 volts and is dependent at least in some phase on the size of the output capacitor $C_{O2}$. Further, at the start of this phase, the signal PWD_IV also disengages a switch M5 coupling $V_{O2}$ to the positive input of the comparator 230. This ensures that the high voltage of $V_{O2}$ (−4.9 volts) during normal operation does not damage the comparator 230. The inverting startup phase concludes with a finish signal CP_IV from the processor after enough time has elapsed to ensure that $V_{O2}$ is at −4.9 volts.

At the conclusion of the soft-start routine (e.g., at time $t_6$), the device may continue to operate normally as no short circuit was detected in the panel 150. If however, the soft start interrupt signal 250 was set because the voltage on $V_{O2}$ exceeded the threshold voltage Vth, then the device may be locked into a fault state until the compromised panel can be serviced.

The above numerical examples in relation to FIGS. 2 and 3 are one embodiment. Additional thresholds and configurations may also be implemented. As many different panels exhibit many different electrical characteristics, one may set the reference voltage Vth to different voltage levels in order to provide a more or less aggressive protection method. The above example had a reference voltage threshold set to 300 mV. This may typically correspond to a panel 150 having a compromised resistance of approximately 3000 ohms while the capacitor $C_{O2}$ is 10 uF. If one were to be more aggressive with the protection method, the threshold may be set to 250 mV which may correspond to a panel 150 having a compromised resistance of approximately 3000 ohms (same as before) but with the capacitor $C_{O2}$ being 20 uF. Yet another embodiment is even more aggressive with setting the threshold to 175 mV which results in a higher compromised resistance of approximately 5000 ohms while $C_{O2}$ is at 10 uF. Generally speaking, one may design the length of the boost soft-start phase to ensure that VO2 stabilizes after any transient response from the output capacitor CO2 is diminished. One may characterize this time period in terms of a threshold resistance by which the panel may not fall below during this phase of startup:

$$R_{P-th} = \left(\frac{V_{o1}}{V_{th}} - 1\right) \times R_{fd}.$$

such that is $R_p$ falls lower than $R_{p-th}$, then the panel 150 will be judged to be damaged.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A device comprising:

a display having a first power node and a second power node;

a power supply circuit having first and second supply nodes respectively coupled to the first and second power nodes and configured to generate a first ramped voltage signal on the first supply node during a first phase of a startup routine and generate a second ramped voltage signal on the second supply node during a second phase of the startup routine; and a detection circuit and a control unit cooperating therewith to sense a current through the display during the first phase, responsive to sensing the current, disable the generation of the first ramped voltage signal by the power supply circuit, and responsive to not detecting the current through the display, disable the detection circuit.

2. The device of claim 1, wherein the display further comprises an active matrix organic light emitting diode display.

3. The device of claim 1, wherein the power supply circuit comprises:

a boost converter including a plurality of switches configured to generate a first output voltage derived from an input voltage; and an inverting converter including a plurality of switches configured to generate a second output voltage having an opposite polarity as the first output voltage and derived from the input voltage.

4. The device of claim 1, wherein the detection circuit further comprises:

a switch configured to couple an output node of the power supply circuit to a reference node;

a comparator configured to compare a voltage on the output node of the power supply circuit to a reference voltage; and an interruption circuit configured to interrupt the power supply circuit if the voltage on the output node exceeds the reference voltage.

5. The device of claim 1, further comprising a battery coupled to the power supply circuit.

6. The device of claim 1, further comprising a processor coupled to the power supply circuit and coupled to the display, the processor configured to control the power supply circuit and to control the display.

7. An integrated circuit comprising:

a power supply circuit having first and second supply nodes to be respectively coupled with first and second power nodes of an electronic component, the power supply circuit being configured to generate a first ramped voltage signal on the first supply node during a first phase of a startup routine and generate a second ramped voltage signal on the second supply node during a second phase of the startup routine; and a detection circuit and a control unit cooperating therewith to sense a current through the electronic component during the first phase, responsive to sensing the current, disable the generation of the first ramped voltage signal by the power supply circuit, and responsive to not detecting the current through the electronic component, disable the detection circuit.

8. The integrated circuit of claim 7 wherein the power supply circuit further comprises a dual DC-DC converter configured to receive an input voltage of approximately 4.6 volts and to produce a voltage of approximately 7.0 volts on the first node after the first phase and to produce a voltage of approximately −7.0 volts on the second node after the second phase.

9. The integrated circuit of claim 7 wherein threshold voltage comprises a voltage of approximately 300 mV.

10. The integrated circuit of claim 7 further comprising a switch operable to decouple the detection circuit from the second node after the first phase.

11. The integrated circuit of claim 7 wherein said power supply circuit comprises a dual DC-DC voltage converter.

12. A method for a power startup routine, comprising:

enabling a power supply circuit having first and second supply nodes coupled to an electrical component;

generating a first ramped voltage signal on the first supply node during a first phase of the startup routine;

enabling a detection circuit configured to sense a current through the electrical component during the first phase;

in response to detecting the current, disabling the generation of the first ramped voltage signal; and in response to not detecting a current:

disabling the detection circuit; and generating a second ramped voltage signal on the second supply node during a second phase of the startup routine.

13. The method of claim 12, wherein the generating the first ramped voltage signal further comprises generating the first ramped voltage signal with a slope dependent upon a first capacitor coupled to the first supply node and the generating the second ramped voltage signal further comprises generating the second ramped voltage signal with a slope dependent upon a second capacitor coupled to the first supply node.

14. The method of claim 13, wherein the size of the second capacitor is related to a short circuit resistance of the electrical component.

15. The method of claim 12, further comprising locking in the disabling of the first ramped voltage signal such that startup routine may not be started again until unlocked.

* * * * *